(12) United States Patent
Hirata et al.

(10) Patent No.: US 8,562,071 B2
(45) Date of Patent: Oct. 22, 2013

(54) ROOF APPARATUS FOR VEHICLE

(75) Inventors: Tetsuya Hirata, Jiangsu (CN); Chitose Nishiyama, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/552,798

(22) Filed: Jul. 19, 2012

(65) Prior Publication Data

US 2013/0020837 A1    Jan. 24, 2013

(30) Foreign Application Priority Data

Jul. 20, 2011    (JP) .................. 2011-159071

(51) Int. Cl.
*B60J 7/057* (2006.01)
*B60J 7/05* (2006.01)

(52) U.S. Cl.
USPC ............... 296/223; 296/216.08; 296/221

(58) Field of Classification Search
USPC .................................. 296/216.01–224
See application file for complete search history.

(56) References Cited

U.S. PATENT DOCUMENTS

| | | | | |
|---|---|---|---|---|
| 5,092,651 A | * | 3/1992 | Baldwin et al. | 296/223 |
| 6,779,836 B2 | * | 8/2004 | Bachmann et al. | 296/216.08 |

FOREIGN PATENT DOCUMENTS

JP    2006-27493    2/2006

OTHER PUBLICATIONS

T. Hattori et al., "Roof Apparatus for Vehicle," U.S. Appl. No. 13/542,039, filed Jul. 5, 2012.

* cited by examiner

*Primary Examiner* — Dennis Pedder
(74) *Attorney, Agent, or Firm* — Finnegan, Henderson, Farabow, Garrett & Dunner, L.L.P.

(57) ABSTRACT

A roof apparatus for a vehicle includes a shoe member and a support member including an end portion rotatably connected to the shoe member within a predetermined rotation range. One of the end portion of the support member and the shoe member integrally includes first and second vertical wall portions and a support portion including a large diameter portion and a small diameter portion. The other of the end portion of the support member and the shoe member includes a bearing portion pivotally supporting the large diameter portion and including an opening through which an insertion and removal of the small diameter portion is allowed in a state where the support member is positioned out of the predetermined rotation range and through which the insertion and removal of the small diameter portion is prohibited in a state where the support member is positioned within the predetermined rotation range.

6 Claims, 3 Drawing Sheets

ROOF APPARATUS FOR VEHICLE

CROSS REFERENCE TO RELATED APPLICATIONS

This application is based on and claims priority under 35 U.S.C. §119 to Japanese Patent Application 2011-159071, filed on Jul. 20, 2011, the entire content of which is incorporated herein by reference.

TECHNICAL FIELD

This disclosure generally relates to a roof apparatus for a vehicle.

BACKGROUND DISCUSSION

A known roof apparatus for a vehicle is disclosed in JP2006-27493A (which will be hereinafter referred to as Reference 1). The roof apparatus disclosed in Reference 1 includes a pair of shoe members (a front shoe member and a rear shoe member) mounted to be movable in a longitudinal direction of the vehicle along a guide rail provided at each edge of an opening portion in a width direction of the vehicle, the opening portion being formed at a roof portion of a vehicle body of the vehicle. The front shoe member and the rear shoe member are positioned to be separated from each other in the longitudinal direction of the vehicle. The roof apparatus also includes a support member of which a front edge portion is rotatably connected to the front shoe member and of which a rear edge portion engages with the rear shoe member to thereby support a movable panel opening and closing the opening portion. In a case where the front and rear shoe members move in the longitudinal direction of the vehicle, the movable panel opens and closes accordingly.

The front shoe member disclosed in Reference 1 is assumed to be rotatably connected to the front edge portion of the support member in a state where a support pin, of which a center line (an axial line) extends in the width direction of the vehicle, penetrates through the shoe member and the support member in the extending direction of the support pin. In this case, in order to inhibit the support pin from disengaging in the width direction of the vehicle, an end portion of the support pin that penetrates through the shoe member and the support member may be pressed and crushed by riveting, or a circumferential groove is formed at the end portion of the support pin so that an E-ring is fitted to the circumferential groove. As a result, manufacturing man-hours and/or the number of components of the roof apparatus increase, which may lead to an increase of a cost.

A need thus exists for a roof apparatus for a vehicle which is not susceptible to the drawback mentioned above.

SUMMARY

According to an aspect of this disclosure, a roof apparatus for a vehicle includes a shoe member mounted to be movable in a longitudinal direction of the vehicle along a guide rail provided at an edge portion of an opening portion in a width direction of the vehicle, the opening portion being formed at a roof portion of a vehicle body of the vehicle, and a support member supporting a movable panel opening and closing the opening portion, the support member including an end portion rotatably connected to the shoe member within a predetermined rotation range. One of the end portion of the support member and the shoe member integrally includes first and second vertical wall portions arranged side by side in the width direction of the vehicle and a support portion arranged between the first and second vertical wall portions to be connected to the first and second vertical wall portions in the width direction of the vehicle, the support portion including a center line extending in the width direction of the vehicle, the support portion including a large diameter portion from which a distance to the center line is constant and a small diameter portion from which a distance to the center line is shorter than the distance from the large diameter portion to the center line. The other of the end portion of the support member and the shoe member includes a bearing portion pivotally supporting the large diameter portion and including an opening through which an insertion and removal of the small diameter portion is allowed in a state where the support member is positioned out of the predetermined rotation range and through which the insertion and removal of the small diameter portion is prohibited in a state where the support member is positioned within the predetermined rotation range.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
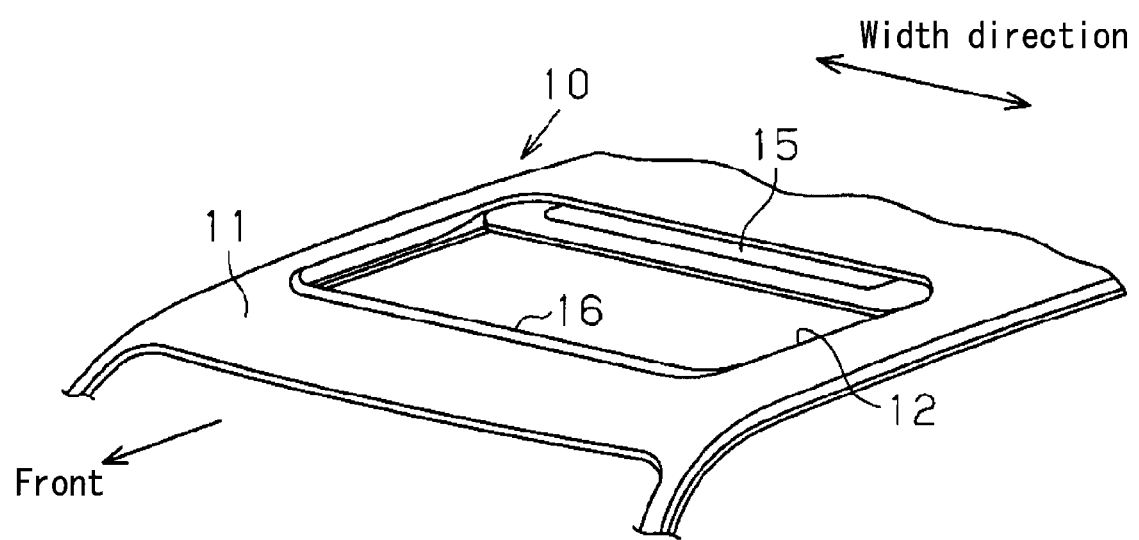
FIG. 1 is a perspective view schematically illustrating a sunroof apparatus according to an embodiment disclosed here.

An embodiment will be explained with reference to FIGS. 1 to 5. In the embodiment, directions and orientations such as left, right, front, rear, top, and bottom correspond to those when viewed from a passenger in a vehicle. As illustrated in FIG. 1, a sunroof apparatus 10 serving as a roof apparatus for a vehicle is mounted at a roof portion 11 of a vehicle body where an opening portion 12 substantially having a rectangular shape is formed. The sunroof apparatus 10 includes a movable panel 15 moving in a longitudinal direction of the vehicle so as to open and close the opening portion 12. The movable panel 15 is formed by a glass plate, for example, and is substantially formed into a rectangular shape. The sunroof apparatus 10 also includes a deflector 16 arranged and supported at a front edge of the opening portion 12.

The movable panel 15 is mounted so as to be upwardly tiltable, downwardly tiltable, and slidable in the longitudinal direction of the vehicle. That is, the movable panel 15 performs a tilt-up operation (a tilt operation), a tilt-down operation (the tilt operation), and a slide operation. In the tilt-up operation, the movable panel 15 rotates in one direction relative to a front portion of the movable panel 15 so that a rear portion thereof moves upward. In the tilt-down operation, the movable panel 15 rotates in the other direction relative to the front portion of the movable panel 15 so that the rear portion thereof moves downward. The movable panel 15 operates in an inner-sliding manner when opening and closing so as to slide in the tilt-down state.

The deflector 16 is mounted so as to be upwardly tiltable (i.e., the deflector 16 performs a tilt-up operation). In the tilt-up operation, the deflector 16 rotates relative to a rear portion of the deflector 16 so that a front portion thereof moves upwardly. The deflector 16 performs the tilt-up operation when an upper side of the deflector 16 is released in association with an open operation of the movable panel 15. At this time, the deflector 16 projects upwardly from an upper surface of the roof portion 11 (i.e., the deflector 16 is in a deployed state). On the other hand, the deflector 16 is pressed down in association with a close operation of the movable panel 15 so as to be retracted to a lower side of the upper surface of the roof portion 11 (i.e., the deflector 16 is in a retracted state). The deflector 16 in the deployed state when the opening portion 12 is opened inhibits aerial vibration that is caused by wind entering an interior of the vehicle.

Figure 2:
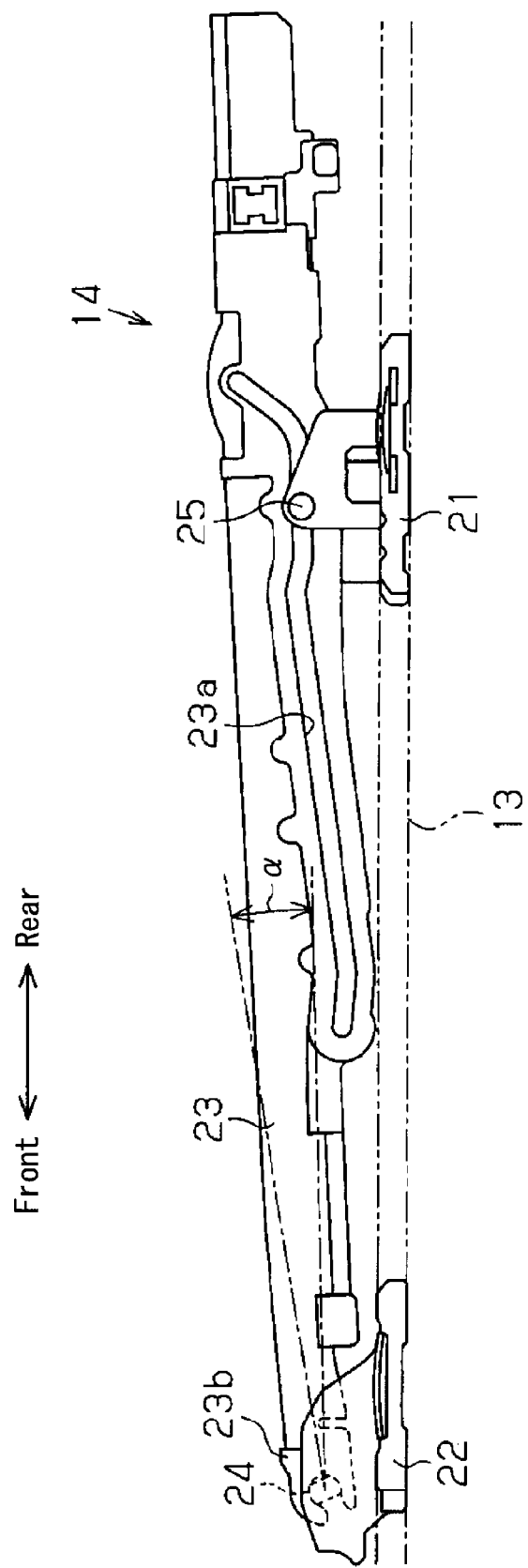
FIG. 2 is a side view of the sunroof apparatus illustrated in FIG. 1.

A pair of guide rails 13 is arranged and fixed at respective edge portions of the opening portion 12 in a width direction of the vehicle (corresponding to a width direction of the roof portion 11). FIG. 2 illustrates one of the guide rails 13. Each of the guide rails 13, which is made of an aluminum alloy extruded material, for example, extends in the longitudinal direction of the vehicle (corresponding to a longitudinal direction of the roof portion 11) while substantially having a C-shape in a cross section.

Functional members 14 are supported by the respective guide rails 13 so as to be movable in the longitudinal direction of the vehicle. Both side portions of the movable panel 15 in the width direction of the vehicle are fixed and supported by the respective functional members 14. The functional members 14 move in the longitudinal direction of the vehicle along the guide rails 13 so that the movable panel 15 performs the tilt-up operation, the tilt-down operation, and the slide operation.

Each of the functional members 14 includes a rear shoe 21 guided and supported so as to be movable along the guide rail 13 in the longitudinal direction of the vehicle. The functional member 14 also includes a front shoe 22 provided at a front side of the rear shoe 21 and guided and supported so as to be movable along the guide rail 13 in the longitudinal direction of the vehicle. The front shoe 22 serving as a shoe member is made of resin. The rear shoe 21 is connected to an electric motor, for example, and is driven by the electric motor so as to be movable in the longitudinal direction of the vehicle.

The functional member 14 further includes a support member 23 of which a front end portion 23b serving as an end portion is pivotally supported by a support portion 24 provided at the front shoe 22 and substantially having an elliptical shape in a cross section. A center line of the support portion 24 extends in the width direction of the vehicle. The support member 23 extending in the longitudinal direction of the vehicle includes an elongated guide bore 23a (hereinafter simply referred to as a guide bore 23a) at a rear side of the support portion 24. A support pin 25 provided at the rear shoe 21 and including a center line that extends in the width direction of the vehicle is inserted into the guide bore 23a so that the support member 23 is rotatably connected to the rear shoe 21 and is movable in the longitudinal direction of the vehicle along the guide bore 23a. The movable panel 15 is fixed and supported relative to the functional member 14 via the support member 23.

In a fully closed state of the movable panel 15 as illustrated in FIG. 2, the guide bore 23a is formed so as to be inclined upwardly as a whole towards a rear side of the vehicle. The support pin 25 provided at the rear shoe 21 is arranged in a middle of the guide bore 23a in a longitudinal direction thereof while the movable panel 15 is in the fully closed state.

Accordingly, in a case where the rear shoe 21 moves forward along the guide rail 13 while the movable panel 15 is in the fully closed state, the support member 23 rotates in a counterclockwise direction in FIG. 2 relative to the front end portion 23b (i.e., the support portion 24) because the support member 23 is pushed up by the support pin 25 at the guide bore 23a. At this time, the movable panel 15 performs the tilt-up operation where the rear portion of the movable panel 15 is raised relative to the front portion. On the other hand, in a case where the rear shoe 21 moves rearward along the guide rail 13 while the movable panel 15 is in the fully closed state, the support member 23 is pulled down by the support pin 25 at the guide bore 23a so that the movable panel 15 performs the tilt-down operation where the rear portion of the movable panel 15 is lowered relative to the front portion.

A rotation range of the support member 23 relative to the front end portion 23b (the support portion 24) is specified to be a predetermined rotation range α. In a case where the support member 23 is positioned within the predetermined rotation range α, an operation range of the movable panel 15 is defined from the tilt-up operation to the tilt-down operation. That is, during a normal operation of the sunroof apparatus 10, the support member 23 is inhibited from rotating beyond the predetermined rotation range α.

In the tilt operation of the movable panel 15, the movement of the front shoe 22 in the longitudinal direction of the vehicle while the front shoe 22 is being pushed by the support member 23 via the support portion 24 is restricted by a check member. In a case where the support pin 25 reaches a rear end portion of the guide bore 23a in association with the rearward movement of the rear shoe 21 along the guide rail 13, the tilt-down operation of the movable panel 15 is completed. At this time, the restriction of the rearward movement of the front shoe 22 by the check member is configured to be released. Thus, when the rear shoe 21 further moves rearward along the guide rail 13, the support member 23 and the front shoe 22 integrally move rearward so that the movable panel 15 performs the open operation while the movable panel 15 is maintained to be in the tilt-down state. As a result, the movable panel 15 is brought to a fully open state to thereby open the opening portion 12.

On the other hand, in a case where the rear shoe 21 moves forward along the guide rail 13 in the fully open state of the movable panel 15, the rotation of the support member 23 relative to the front end portion 23b (i.e., the support portion 24) is restricted by the check member. Thus, the support member 23 and the front shoe 22 integrally move forward so that the movable panel 15 performs the close operation while the movable panel 15 is maintained to be in the tilt-down state. When the movable panel 15 returns to a state or a position where the tilt-down operation is completed as mentioned above, the restriction of the rotation of the support member 23 is released while the movement of the front shoe 22 in the longitudinal direction of the vehicle is restricted by the check member. Thus, when the rear shoe 21 further moves forward along the guide rail 13 in such state, the support member 23 is pushed up by the support pin 25 at the guide bore 23a so that the movable panel 15 performs the tilt-up operation and returns to the fully closed state.

Figure 3:
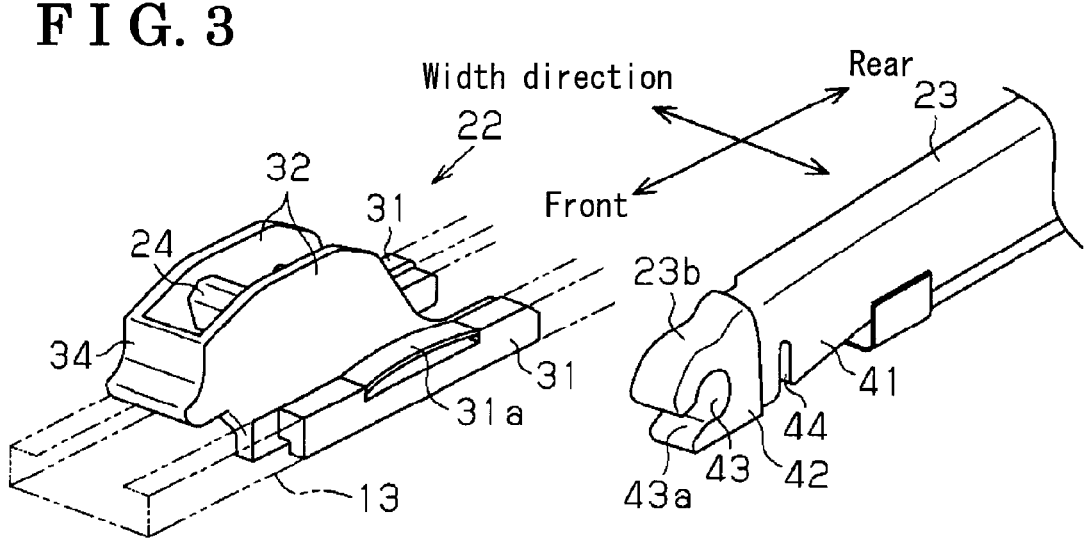
FIG. 3 is an exploded perspective view of a shoe member and a support member of the sunroof apparatus.
Figure 4:
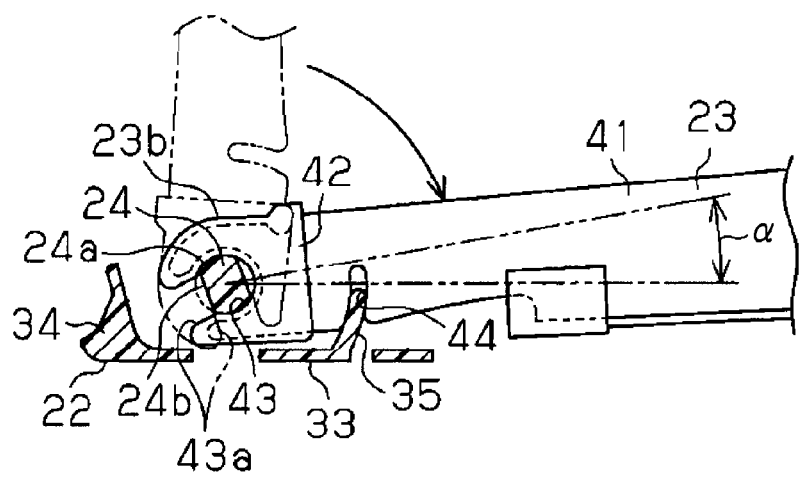
FIG. 4 is a longitudinal sectional view of the shoe member and the support member of the sunroof apparatus.

Next, a structure to support the front end portion 23b of the support member 23 by the front shoe 22 (the support portion 24) will be explained. As illustrated in FIGS. 3 and 4, the front shoe 22 integrally includes first and second sliding portions 31, and first and second vertical wall portions 32. The first and second sliding portions 31 are arranged side by side in the width direction of the vehicle so as to slide on the guide rail 13. The first and second vertical wall portions 32 are connected to respective end portions of the first and second sliding portions 31 facing in the width direction of the vehicle and are formed to substantially extend in a height direction of the vehicle. The first and second sliding portions 31 include first and second deflection portions 31a each serving as a deflection portion, curved in the height direction of the vehicle and supported at two positions separated from each other in the longitudinal direction of the vehicle (i.e., supported by a both-end support structure). In a case where the first and second sliding portions 31 slide on the guide rail 13, the first and second deflection portions 31a elastically make contact with the guide rail 13 to thereby stabilize the operation of the first and second sliding portions 31 relative to the guide rail 13 while a sliding resistance is restrained, for example.

As illustrated in FIG. 4, the front shoe 22 integrally includes a bottom wall portion 33 arranged between the first and second vertical wall portions 32 at an upper side of the first and second sliding portions 31 so as to be connected to the first and second vertical wall portions 32 in the width direction of the vehicle. The bottom wall portion 33 substantially extends in a planar manner along the guide rail 13 between the first and second vertical wall portions 32.

The support portion 24 is arranged between the first and second vertical wall portions 32 so as to be positioned at an upper side of an intermediate portion of the bottom wall portion 33 in the longitudinal direction of the vehicle and so as to be connected to the first and second vertical wall portions 32 in the width direction of the vehicle. The support portion 24, substantially having the elliptical shape in the cross section, includes a large diameter portion 24a and a small diameter portion 24b. The large diameter portion 24a includes a pair of minor arcs facing each other in a radial direction relative to a center line of the ellipse of the support portion 24 in the cross section. The small diameter portion 24b includes a pair of straight lines facing each other while each connecting respective end portions of the pair of minor arcs of the large diameter portion 24a. That is, the support portion 24 includes an outer shape corresponding to a circular cylindrical shape having the same outer diameter as that of the large diameter portion 24a but a pair of circumferential portions facing each other in the radial direction is chamfered in a planar manner from the circular cylindrical shape. A distance from the pair of minor arcs of the large diameter portion 24a to the center line of the ellipse of the support portion 24 in the cross section is constant. In addition, a distance from the pair of straight lines of the small diameter portion 24b to the center line of the ellipse of the support portion 24 in the cross section is smaller than the distance from the pair of minor arcs of the large diameter portion 24a to the center line of the ellipse. The support portion 24 is arranged so that the small diameter portion 24b substantially extends in the height direction of the vehicle.

A guide wall portion 34 is formed at a front side of the support portion 24 so as to block or cover a front side of each of the first and second vertical wall portions 32 and the bottom wall portion 33. The guide wall portion 34 is forwardly sharpened as illustrated in FIG. 3. In addition, an engagement projection portion 35 is formed at a rear side of the support portion 24 so as to project upwardly from the bottom wall portion 33 as illustrated in FIG. 4. Specifically, the engagement projection portion 35 extends in an arc shape relative to the center line of the support portion 24 in the height direction of the vehicle.

The front end portion 23b of the support member 23 is obtained by a front end portion of a body portion 41 being embedded into a molded portion 42. The body portion 41 extending in the longitudinal direction of the vehicle is made of steel plate while the molded portion 42 is made of resin. The front end portion 23b is molded in a scissors form substantially opening towards a front side of the vehicle. The front end portion 23b includes a bearing portion 43 substantially formed into a U-shaped groove extending in the width direction of the vehicle.

As indicated by a solid line in FIG. 4, in a case where the support member 23 is positioned within the predetermined rotation range α (i.e., during the normal operation of the sunroof apparatus 10), the bearing portion 43 pivotally supports the large diameter portion 24a and inhibits an insertion and removal of the small diameter portion 24b through an opening 43a of the bearing portion 43. In addition, as indicated by a chain double-dashed line in FIG. 4, in a case where the support member 23 is in a predetermined rotation position out of the predetermined rotation range α, the bearing portion 43 allows the insertion and removal of the small diameter portion 24b through the opening 43a. Accordingly, at a time of assembling the front end portion 23b of the support member 23 on the front shoe 22, the small diameter portion 24b is radially inserted into the opening 43a of the bearing portion 43 in a state where the support member 23 is in the predetermined rotation position out of the predetermined rotation range α. Then, the support member 23 is rotated about the support portion 24 so as to be positioned within the predetermined rotation range α. The insertion and removal of the small diameter portion 24b through the opening 43a of the bearing portion 43 is inhibited accordingly. The small diameter portion 24b of the support portion 24 is restrained from radially disengaging from the support member 23 via the opening 43a of the bearing portion 43. In addition, the bearing portion 43 pivotally supporting the support portion 24 (the large diameter portion 24a) is disposed and held between the first and second vertical wall portions 32 arranged side by side in the width direction of the vehicle. Thus, the bearing portion 43 is inhibited from disengaging from the front shoe 22 in the width direction of the vehicle.

The body portion 41 of the support member 23 includes an engagement groove 44 formed into an arc shape relative to the center line of the support portion 24. In a state where the support member 23 is positioned within the predetermined rotation range α, the engagement projection portion 35 is fitted to the engagement groove 44. Thus, while being allowed to rotate about the support portion 24 within the predetermined rotation range α, the support member 23 is inhibited to move in the longitudinal direction of the vehicle by the engagement projection portion 35. That is, a movement locus of the support member 23 in the longitudinal direction of the vehicle is blocked by the engagement projection portion 35. The movement of the support member 23 in the longitudinal direction of the vehicle relative to the front shoe 22 is inhibited accordingly.

Figure 5:
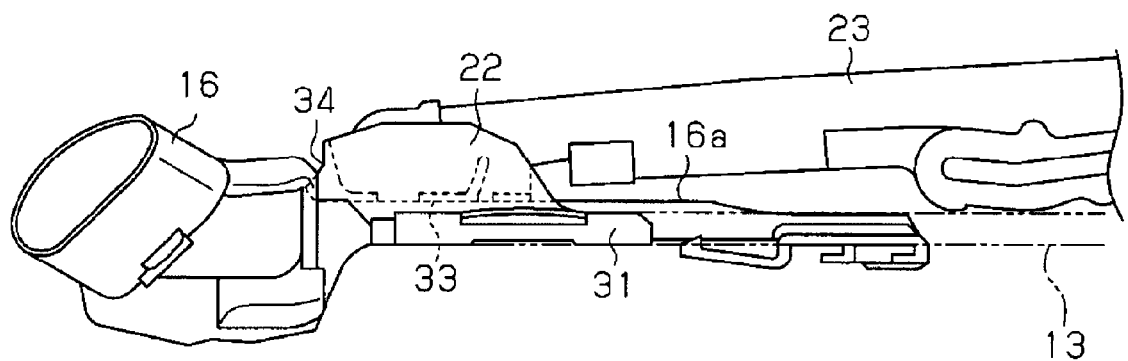
FIG. 5 is a side view of a deflector, the shoe member, and the support member of the sunroof apparatus.

As illustrated in FIG. 5, an arm portion 16a of the deflector 16 is connected to a front end portion of each of the guide rails 13 in a manner where the arm portion 16a is rotatable about a rear end portion thereof. The arm portion 16a, extending in the longitudinal direction of the vehicle, is positioned at an intermediate portion of the guide rail 13 in the width direction of the vehicle where the guide rail 13 opens upwardly. The arm portion 16a is biased to rotate in one direction (i.e., in a clockwise direction in FIG. 5) by a biasing member. In addition, in the fully closed state of the movable panel 15, the arm portion 16a is maintained in a state to rotate in the other direction (i.e., in a counterclockwise direction in FIG. 5) against a biasing force of the biasing member in a state where an upper surface of the arm portion 16a is pressed by a lower surface of the bottom wall portion 33 of the front shoe 22.

Accordingly, when the upper surface of the arm portion 16a is released from the lower surface of the bottom wall portion 33 of the front shoe 22 in association with the open operation of the movable panel 15, the arm portion 16a biased by the biasing member rotates in one direction (in the clockwise direction in FIG. 5) about the rear end portion thereof. That is, the deflector 16 performs the tilt-up operation (the deflector 16 is in the deployed state). On the other hand, when the upper surface of the arm portion 16a is pressed by the lower surface of the bottom wall portion 33 of the front shoe 22 in association with the close operation of the movable panel 15, the arm portion 16a rotates in the other direction (the counterclockwise direction in FIG. 5) about the rear end portion thereof against the biasing force of the biasing member. That is, the deflector 16 performs the tilt-down operation (the deflector 16 is in the retracted state). In the close operation of the movable panel 15, the guide wall portion 34 of the front shoe 22 makes contact with the upper surface of the arm portion 16a so that the arm portion 16a is guided to the lower side of the bottom wall portion 33.

Next, an operation when the front end portion 23b of the support member 23 is assembled on the front shoe 22 (the support portion 24) will be explained. In order to assemble the front end portion 23b of the support member 23 on the front shoe 22, the small diameter portion 24b is radially inserted into the opening 43a of the bearing portion 43 while the support member 23 is in the predetermined rotation position out of the predetermined rotation range α as indicated by a chain double-dashed line in FIG. 4. Afterwards, the support member 23 is rotated relative to the support portion 24 so as to be positioned within the predetermined rotation range α to thereby inhibit the insertion and removal of the small diameter portion 24b in the radial direction through the opening 43a of the bearing portion 43. Accordingly, the small diameter portion 24b of the support portion 24 is restrained from disengaging in the radial direction from the support portion 24 through the opening 43a of the bearing portion 43. The large diameter portion 24a of the support portion 24 is pivotally supported by the bearing portion 43 accordingly.

In addition, the engagement projection portion 35 is fitted to the engagement groove 44. Thus, the support member 23 is inhibited from moving in the longitudinal direction of the vehicle relative to the front shoe 22 while being allowed to rotate about the support portion 24 within the predetermined rotation range α.

Accordingly, the front end portion 23b of the support member 23 is rotatably connected to the front shoe 22 (the support portion 24).

According to the aforementioned embodiment, the bearing portion 43 of the support member 23 pivotally supporting the support portion 24 (the large diameter portion 24a) is inhibited from disengaging in the width direction of the vehicle because the bearing portion 43 is disposed and held between the first and second vertical wall portions 32 arranged side by side in the width direction of the vehicle. In this case, because the first and second vertical wall portions 32 and the support portion 24 are integrally formed at the front shoe 22, the increase of the number of components is restrained. In the case of assembling the front end portion 23b of the support member 23 on the front shoe 22, the small diameter portion 24b is inserted into the opening 43a of the bearing portion 43 in the radial direction while the support member 23 is in the predetermined rotation position out of the predetermined rotation range α. Then, the support member 23 is rotated about the support portion 24 so as to be positioned within the predetermined rotation range α to thereby inhibit the insertion and removal of the small diameter portion 24b in the radial direction through the opening 43a of the bearing portion 43. As a result, the small diameter portion 24b of the support portion 24 is restrained from radially disengaging from the support member 23 through the opening 43a of the bearing portion 43. Accordingly, because of simple assembly procedures, the front end portion 23b of the support member 23 is connectable to the front shoe 22, which leads to a reduction of manufacturing man-hours.

In addition, according to the aforementioned embodiment, the engagement projection portion 35 extending in the height direction of the vehicle is fitted to the engagement groove 44 in a case where the support member 23 is in the predetermined rotation range α. Thus, while being allowed to rotate about the support portion 24 within the predetermined rotation range α, the support member 23 is inhibited to move (i.e., the movement locus of the support member 23 is blocked) in the longitudinal direction of the vehicle by the engagement projection portion 35. The movement of the support member 23 in the longitudinal direction of the vehicle relative to the front shoe 22 is blocked. Accordingly, a sliding resistance in the longitudinal direction of the vehicle when the movable panel 15 is opened and closed is securely supported. In addition, the sunroof apparatus 10 for opening and closing a larger movable panel may be achieved according to the present embodiment. Further, a resin material at a further reduced cost is applicable to a material of the front shoe 22.

Even when the functional member 14 malfunctions, a possible load generated at that time may be supported by the contact between the engagement projection portion 35 and the engagement groove 44. In addition, even when the opening direction of the bearing portion 43 substantially matches the longitudinal direction of the vehicle, the front end portion 23b of the support member 23 pressed by the support portion 24 in association with the movement of the front shoe 22 in the longitudinal direction of the vehicle is restrained from disengaging in the radial direction from the support portion 24 via the opening 43a of the bearing portion 43 by the contact between the engagement projection portion 35 and the engagement groove 44.

Further, according to the aforementioned embodiment, the bearing portion 43 of the support member 23 pivotally supports the large diameter portion 24a at an upper side and a lower side of the support portion 24. Thus, a retention strength for the movable panel 15 supported by the support member 23 in the height direction of the vehicle is sufficiently ensured.

Furthermore, according to the aforementioned embodiment, the arm portion 16a of the deflector 16 is arranged to overlap the functional member 14 (the front shoe 22) in the width direction of the vehicle. Thus, as compared to a case where the arm portion 16a and the functional member 14 are displaced in the width direction of the vehicle, an enlargement of the sunroof apparatus 10 in the width direction is restrained. In addition, a possibility of an interference of the functional member 14 with the arm portion 16a, which may occur when the arm portion 16a and the functional member 14 are arranged side by side in the width direction, is reduced. Further, because the deflector 16 is directly operated by the functional member 14 (the front shoe 22), an operation timing of the deflector 16 is accurately specified because of a decrease of an assembly error, compared to a case where the deflector 16 is operated via the movable panel 15.

Furthermore, according to the aforementioned embodiment, the front shoe 22 is integrally formed to thereby increase a design (shape) flexibility, which leads to a reduction of a wind noise that may occur in the fully open state of the movable panel 15, for example.

Furthermore, according to the aforementioned embodiment, the connection between the support portion 24 of the front shoe 22 and the front end portion 23b of the support member 23 (the molded portion 42) is obtained by the connection between resin materials, which may lead to a reduction of a looseness. The greaseless support portion 24 of the front shoe 22 and/or the greaseless front end portion 23b of the support member 23 may be achieved by a change of the resin material or an addition of an additive agent, for example. An abrasion of the resin member may be restrained as compared to a case where the connection between the support portion 24 of the front shoe 22 and the front end portion 23b of the support member 23 is achieved by the connection between iron and resin.

The aforementioned embodiment may be modified as below. The first and second vertical wall portions 32 and the support portion 24 may be formed at the front end portion 23b of the support member 23 while the bearing portion 43 may be formed at the front shoe 22.

The engagement projection portion 35 may be formed at the support member 23 while the engagement groove 44 may be formed at the front shoe 22. The support member connected to the shoe member may be a link (i.e., a so-called lift link) supporting a rear end portion of the movable panel that performs the tilt operation. In this case, the shoe member and the support member correspond to the rear shoe and a rear link arranged at the rear side of the movable panel.

The support member connected to the shoe member may be a link supporting the movable panel that performs a pop-up operation. In this case, the shoe member and the support member may correspond to the front shoe and a front link arranged at the front side of the movable panel or may correspond to the rear shoe and the rear link arranged at the rear side of the movable panel.

In the aforementioned embodiment, a configuration of the functional member 14 related to the open and close operation of the movable panel 15 is an example. For example, the guide bore 23a may be provided at the rear shoe 21 while the support pin 25 inserted into the guide bore 23a may be provided at the support member 23. In addition, a series of operations of the movable panel 15 (i.e., the tilt-up, tilt-down, and slide operations) may be achieved only by the movement of the functional member 14 in the rearward direction of the vehicle.

According to the aforementioned embodiment, one of the support member 23 and the front shoe 22 includes the engagement projection portion 35 formed into an arc shape relative to the support portion 24 and extending in the height direction of the vehicle, and the other of the support member 23 and the front shoe 22 includes the engagement groove 44 to which the engagement projection portion 35 is fitted in a state where the support member 23 is positioned within the predetermined rotation range α.

In addition, according to the aforementioned embodiment, the bearing portion 43 supports the large diameter portion 24a at the upper side and the lower side of the large diameter portion 24a in the height direction of the vehicle.

Further, according to the aforementioned embodiment, each of the front shoe 22 and the end portion 23b of the support member 23 is made of a resin material.

Further, according to the aforementioned embodiment, the front shoe 22 includes the first and second sliding portions 31 sliding on the guide rail 13, each of the first and second sliding portions 31 including the deflection portion 31a supported at two positions that are separated from each other in the longitudinal direction of the vehicle and being curved in the height direction of the vehicle, the deflection portion 31a elastically making contact with the guide rail 13.

Further, according to the aforementioned embodiment, the sunroof apparatus 10 further includes the deflector 16 arranged at the edge portion of the opening portion 12 in the longitudinal direction of the vehicle, the deflector 16 projecting upwardly from the upper surface of the roof portion 11 in association with the open operation of the movable panel 15 and being retracted to the lower side of the upper surface of the roof portion 11 in association with the close operation of the movable panel 15. The arm portion 16a of the deflector 16 connected to the end portion of the guide rail 13 in the longitudinal direction of the vehicle is arranged to overlap the front shoe 22 in the width direction of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
a shoe member mounted to be movable in a longitudinal direction of the vehicle along a guide rail provided at an edge portion of an opening portion in a width direction of the vehicle, the opening portion being formed at a roof portion of a vehicle body of the vehicle; and
a support member supporting a movable panel opening and closing the opening portion, the support member including an end portion rotatably connected to the shoe member within a predetermined rotation range, wherein
one of the end portion of the support member and the shoe member integrally includes first and second vertical wall portions arranged side by side in the width direction of the vehicle and a support portion arranged between the first and second vertical wall portions to be connected to the first and second vertical wall portions in the width direction of the vehicle, the support portion including a center line extending in the width direction of the vehicle, the support portion including a large diameter portion from which a distance to the center line is constant and a small diameter portion from which a distance to the center line is shorter than the distance from the large diameter portion to the center line, and wherein
the other of the end portion of the support member and the shoe member includes a bearing portion pivotally supporting the large diameter portion and including an opening through which an insertion and removal of the small diameter portion is allowed in a state where the support member is positioned out of the predetermined rotation range and through which the insertion and removal of the small diameter portion is prohibited in a state where the support member is positioned within the predetermined rotation range.

2. The roof apparatus according to claim 1, wherein one of the support member and the shoe member includes an engagement projection portion formed into an arc shape relative to the support portion and extending in a height direction of the vehicle, and the other of the support member and the shoe member includes an engagement groove to which the engagement projection portion is fitted in a state where the support member is positioned within the predetermined rotation range.

3. The roof apparatus according to claim 1, wherein the bearing portion supports the large diameter portion at an upper side and a lower side of the large diameter portion in a height direction of the vehicle.

4. The roof apparatus according to claim 1, wherein each of the shoe member and the end portion of the support member is made of a resin material.

5. The roof apparatus according to claim 1, wherein the shoe member includes first and second sliding portions sliding on the guide rail, each of the first and second sliding portions including a deflection portion supported at two positions that are separated from each other in the longitudinal direction of the vehicle and being curved in a height direction of the vehicle, the deflection portion elastically making contact with the guide rail.

6. The roof apparatus according to claim 1, further comprising a deflector arranged at an edge portion of the opening portion in the longitudinal direction of the vehicle, the deflector projecting upwardly from an upper surface of the roof portion in association with an open operation of the movable panel and being retracted to a lower side of the upper surface of the roof portion in association with a close operation of the movable panel, wherein an arm portion of the deflector connected to an end portion of the guide rail in the longitudinal direction of the vehicle is arranged to overlap the shoe member in the width direction of the vehicle.

\* \* \* \* \*